United States Patent
Woo et al.

(10) Patent No.: US 12,502,973 B2
(45) Date of Patent: Dec. 23, 2025

(54) REGENERATIVE BRAKING TORQUE CONTROL SYSTEM AND METHOD OF ELECTRIC VEHICLE

(71) Applicants: Hyundai Motor Company, Seoul (KR); Kia Corporation, Seoul (KR)

(72) Inventors: Dong Hyeon Woo, Daegu (KR); Ho Kyun Chun, Seoul (KR); Ho Won Seo, Gwacheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 497 days.

(21) Appl. No.: 17/947,942

(22) Filed: Sep. 19, 2022

(65) Prior Publication Data
US 2023/0116610 A1    Apr. 13, 2023

(30) Foreign Application Priority Data
Oct. 1, 2021    (KR) .......................... 10-2021-0130643

(51) Int. Cl.
*B60L 7/18*    (2006.01)
(52) U.S. Cl.
CPC .............. *B60L 7/18* (2013.01); *B60L 2240/10* (2013.01); *B60L 2250/00* (2013.01);
(Continued)
(58) Field of Classification Search
None
See application file for complete search history.

(56) References Cited

U.S. PATENT DOCUMENTS

| 2007/0057781 A1* | 3/2007 | Breed | B60K 35/22 340/457.1 |
| 2011/0303498 A1* | 12/2011 | Crombez | B60L 15/2009 188/106 P |

(Continued)

FOREIGN PATENT DOCUMENTS

| JP | 2010241166 A | * | 10/2010 |
| JP | 2021111046 A | * | 8/2021 |

(Continued)

OTHER PUBLICATIONS

Machine translation of JP-2010241166-A (Year: 2010).*
Machine translation of JP-2021111046-A (Year: 2021).*

*Primary Examiner* — Anne Marie Antonucci
*Assistant Examiner* — Kyle S Park
(74) *Attorney, Agent, or Firm* — Morgan Lewis & Bockius LLP

(57) ABSTRACT

A regenerative braking torque control system of an electric vehicle, includes a travel information setting section selects a regenerative braking level in response to a driver's input and setting at least one driving mode among a plurality of driving modes, an in-vehicle information detector which detects in-vehicle information corresponding to a number and in-vehicle positions of occupants seated on vehicle seats, and a controller which allows driving to be performed according to the regenerative braking level selected by the travel information setting section, the controller transferring motor torque responsiveness according to the number and the in-vehicle positions of the occupants detected by the in-vehicle information detector to a motor controller for driving the vehicle by reflecting the motor torque responsiveness on regenerative braking torque.

10 Claims, 3 Drawing Sheets

(52) U.S. Cl.
CPC ....... *B60L 2260/20* (2013.01); *B60T 2220/00* (2013.01); *B60T 2250/00* (2013.01); *B60T 2270/60* (2013.01)

(56) References Cited

U.S. PATENT DOCUMENTS

| | | | |
|---|---|---|---|
| 2018/0130449 A1* | 5/2018 | Jeon | H04W 12/08 |
| 2018/0194356 A1* | 7/2018 | Richards | B60W 60/0023 |
| 2018/0201140 A1* | 7/2018 | Shimizu | B60T 1/10 |
| 2018/0361972 A1* | 12/2018 | Zagorski | B60W 30/182 |
| 2022/0169215 A1* | 6/2022 | Muramatsu | B60T 8/1766 |

FOREIGN PATENT DOCUMENTS

| | | |
|---|---|---|
| KR | 10-1526813 B | 6/2015 |
| KR | 10-2020-0050495 A | 5/2020 |

\* cited by examiner

[FIG. 1]
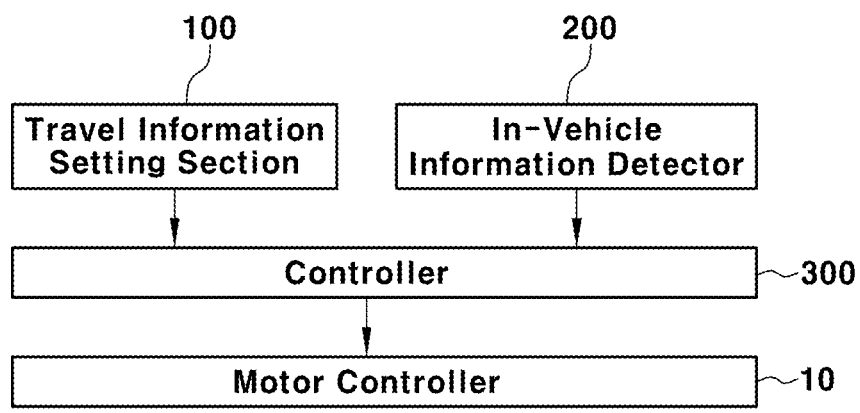
[FIG. 2]
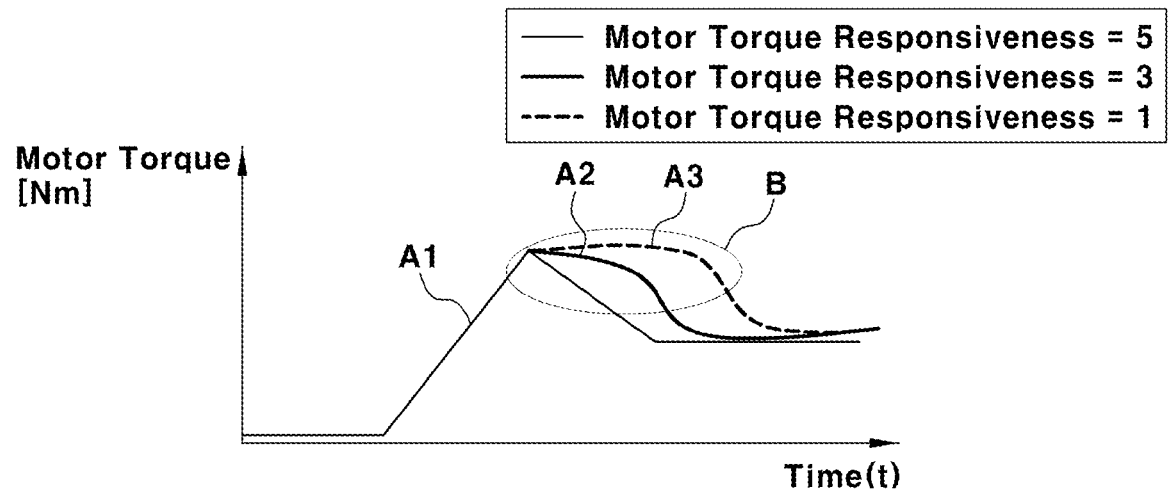

[FIG. 3]
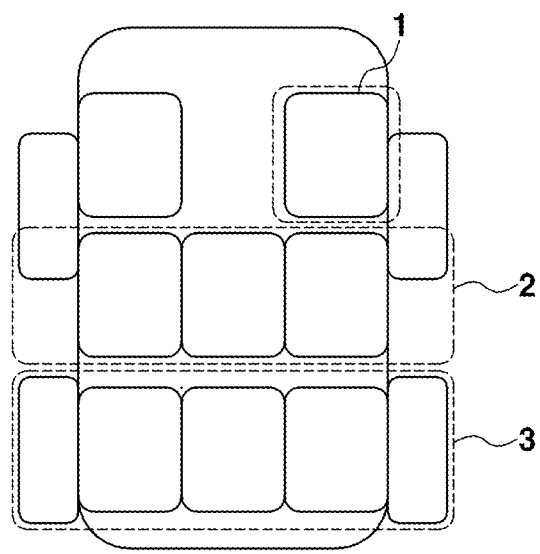

REGENERATIVE BRAKING TORQUE CONTROL SYSTEM AND METHOD OF ELECTRIC VEHICLE

CROSS-REFERENCE TO RELATED APPLICATION

The present application claims priority to Korean Patent Application No. 10-2021-0130643 filed on Oct. 1, 2021, the entire contents of which is incorporated herein for all purposes by this reference.

BACKGROUND OF THE INVENTION

Field of the Invention

The present disclosure relates to a regenerative braking torque control system and method of an electric vehicle, and more specifically, to a regenerative braking torque control system and method of an electric vehicle, wherein the responsiveness of a motor in response to the manipulation of an accelerator position sensor (APS) is controlled to selectively change by reflecting regenerative braking torque considering the number and in-vehicle positions of occupants in a vehicle.

Description of Related Art

In general, regenerative braking is a braking method of generating power by operating a motor as a generator and returning the generated power to a power supply, and is widely used in transportation machines using an electric motor as a power source. A regenerative braking system is widely used in a vehicle using an electric motor as a power source, an electric vehicle, a hybrid vehicle, etc.

When braking a transportation machine to which a regenerative braking system is applied, whether to prioritize regenerative braking or normal friction braking should be determined according to the driving state of the transportation machine and the intention of braking of a driver. When both regenerative braking and friction braking are performed, the magnitude of each braking may be controlled.

As the ratio of regenerative braking is higher, a greater amount of energy is recovered. However, regenerative braking needs to be limited depending on the state of charge of the battery, the temperature of the motor, etc. When regenerative braking force is not controlled in such a situation, the motor or the battery may be severely damaged.

When the regenerative braking force is not sufficient, the deceleration intention of the driver should be satisfied by increasing normal friction braking force.

However, in transportation machines to which such a regenerative braking system is applied, the allowance of regenerative braking is used in a predetermined fixed ratio. The allowance of regenerative braking cannot be actively varied in response to the weight of the transportation machine being changed. Thus, there is a problem in that the regenerative braking system cannot be efficiently operated.

That is, up to now, in transportation machines to which such a regenerative braking system is applied, the amount of regenerative braking has been determined by adjusting the ratio between the amount of regenerative braking and the amount of friction braking, and power only has been generated in an amount limited to the amount of regenerative braking having the determined ratio and returned to the power supply. There is a problem in that efficiently recovering regenerative braking energy by increasing the amount of regenerative braking beyond the present ratio has not been conducted.

Dynamic energy of a traveling transportation machine is composed of kinetic energy and potential energy. The regenerative braking system converts dynamic energy into electrical energy. That is, the conversion of energy in the regenerative braking system is calculated by the following Equations.

$$\text{Dynamic Energy} = \text{Electrical Energy} = \text{Kinetic Energy} + \text{Positional Energy} \quad \text{[Equation 1]}$$

$$\text{Kinetic Energy} + \text{Potential Energy} = MV^2/2 + Mgh = M(V^2/2 + gh) \quad \text{[Equation 2]}$$

Accordingly, electrical energy is regenerated in proportion to the mass or weight M of the transportation machine (where M indicates the mass or weight, V indicates the velocity, g indicates gravitational acceleration, and h indicates the height).

As a result, when referring to Equations 1 and 2 above, to calculate the conversion of energy in the regenerative braking system of the transportation machine, it is important to be able to efficiently vary the amount of regenerative braking according to a change in the weight of the transportation machine, i.e., whether a number of passengers are in a vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present disclosure are directed to providing a regenerative braking torque control system and method of an electric vehicle, wherein, when regenerative braking is used, regenerative braking torque is reflected by considering the number and in-vehicle positions of occupants in a vehicle. As a predetermined set driving mode is selected by a driver, driving is caused to be performed by reflecting motor torque responsiveness, determined based on a score corresponding to the number and in-vehicle positions of occupants, on the regenerative braking torque. Consequently, a differentiated motor torque response range for regenerative braking is formed depending on the number and in-vehicle positions of occupants.

The object of the present disclosure is not limited to the aforementioned object, and the other objects not mentioned may be clearly understood by those with ordinary skill in the art to which various exemplary embodiments of the present disclosure pertains (hereinafter 'those skilled in the art') from the following description.

The features of the present disclosure for achieving the object of the present disclosure, and performing the characteristic functions of the present disclosure to be described later are as follows below.

According to various exemplary embodiments of the present disclosure, a regenerative braking torque control system of an electric vehicle may include: a travel information setting section configured for selecting a regenerative braking level in response to a driver's input and setting at least one driving mode among a plurality of driving modes; an in-vehicle information detector configured for detecting in-vehicle information corresponding to a number and in-vehicle positions of occupants seated on vehicle seats; and a controller configured for allowing driving of the vehicle to be performed according to the regenerative braking level selected by the travel information setting section, the controller transferring motor torque responsiveness according to the number and the in-vehicle positions of the occupants detected by the in-vehicle information detector to a motor controller for driving the vehicle by reflecting the motor torque responsiveness on regenerative braking torque.

Here, the in-vehicle information detector may detect the in-vehicle information using at least one of hydraulic information of the vehicle seats, seatbelt fastening information, or ultrasonic sensor information.

Furthermore, the controller may be configured to determine a total score according to the number and the in-vehicle positions of the occupants detected by the in-vehicle information detector and determines the motor torque responsiveness by applying the total score to a predetermined comparison table.

The total score may be determined differently depending on whether each of the in-vehicle positions with respect to the number of occupants is a seat next to the driver's seat, a second row seat, or a third row sea. In the predetermined comparison table, a plurality of occupant score ranges to which the total score is applied may be divided, and the motor torque responsiveness may be set differently according to the occupant score ranges.

Furthermore, the motor torque responsiveness may be determined to be lower as the total score applied to the occupant score ranges is higher.

According to various exemplary embodiments of the present disclosure, a regenerative braking torque method of controlling an electric vehicle may include: when driving of the vehicle is performed according to a regenerative braking level selected by a travel information setting section, determining whether occupants are in a vehicle by an in-vehicle information detector; when the occupants are determined to be in the vehicle by the in-vehicle information detector, selecting, by a driver, whether to reflect the number of occupants; when the number of occupants is selected to be reflected, selecting, by the travel information setting section, a driving mode; and when a set driving mode among the plurality of driving modes is selected, reflecting motor torque responsiveness according to the number of occupants and in-vehicle positions detected by the in-vehicle information detector on regenerative braking torque and transferring the motor torque responsiveness to a motor controller for the driving.

Here, in the determination of whether the occupants are in the vehicle, when no occupants are determined to be in the vehicle through the in-vehicle information detector, driving may be performed by reflecting the regenerative braking torque corresponding to the regenerative braking level selected by the travel information setting section.

In the selection of the driving mode, when the driving of the vehicle is determined to be performed in another driving mode except for a sports mode among the driving modes for a vehicle in which the set driving mode is not provided, automatic selection may be activated to perform the reflection of the motor torque responsiveness.

Furthermore, in determining that the occupants are in the vehicle, when it is selected by the driver not to reflect the number of occupants, the reflection of the motor torque responsiveness may allow the driving to be performed by reflecting the regenerative braking torque corresponding to a regenerative braking level set to be lowest, among the regenerative braking levels.

Furthermore, the determination of whether occupants are in the vehicle may detect in-vehicle information using at least one of hydraulic information of the vehicle seats, seatbelt fastening information, or ultrasonic sensor information.

Furthermore, the reflection of the motor torque responsiveness may include determining a total score according to the number and the in-vehicle positions of the occupants detected by the in-vehicle information detector and determining the motor torque responsiveness by applying the total score to a predetermined comparison table.

Here, the total score may be determined differently depending on whether each of the in-vehicle positions with respect to the number of occupants is a seat next to the driver's seat, a second row seat, or a third row sea. In the predetermined comparison table, a plurality of occupant score ranges to which the total score is applied may be divided, and the motor torque responsiveness may be set differently according to the occupant score ranges.

Furthermore, the motor torque responsiveness may be determined to be lower as the total score applied to the occupant score ranges is higher.

Furthermore, the regenerative braking torque control method may further include, as the motor torque responsiveness is reflected on the regenerative braking torque, displaying, by the controller, different changes in the regenerative braking torque depending on the number and in-vehicle positions of occupants to the driver.

According to various exemplary embodiments of the present disclosure, when regenerative braking is used, the regenerative braking torque is reflected by considering the number and in-vehicle positions of occupants in a vehicle. As a predetermined set driving mode is selected by the driver, driving is caused to be performed by reflecting the motor torque responsiveness, determined based on a score corresponding to the number and in-vehicle positions of occupants, on the regenerative braking torque. As an effect, a differentiated motor torque response range for regenerative braking is formed depending on the number and in-vehicle positions of occupants.

Accordingly, in various exemplary embodiments of the present disclosure, it is possible to selectively adjust the change of the motor torque for regenerative braking by reflecting the presence of occupants, the number of occupants, and the in-vehicle position. Consequently, in a repeatedly accelerating or decelerating situation, it is possible to prevent occupants from dizziness and thus carsickness.

An effect of the present disclosure is not limited to the aforementioned effect, and the other effects not mentioned may be clearly recognized by those skilled in the art from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a diagram schematically illustrating a regenerative braking torque control system of an electric vehicle according to various exemplary embodiments of the present disclosure;

FIG. 2 is a diagram illustrating changes in motor torque for the regenerative braking torque control system of an electric vehicle according to various exemplary embodiments of the present disclosure;

FIG. 3 is a diagram illustrating a determination of a total score for the regenerative braking torque control system of an electric vehicle according to various exemplary embodiments of the present disclosure.

Figure 4:
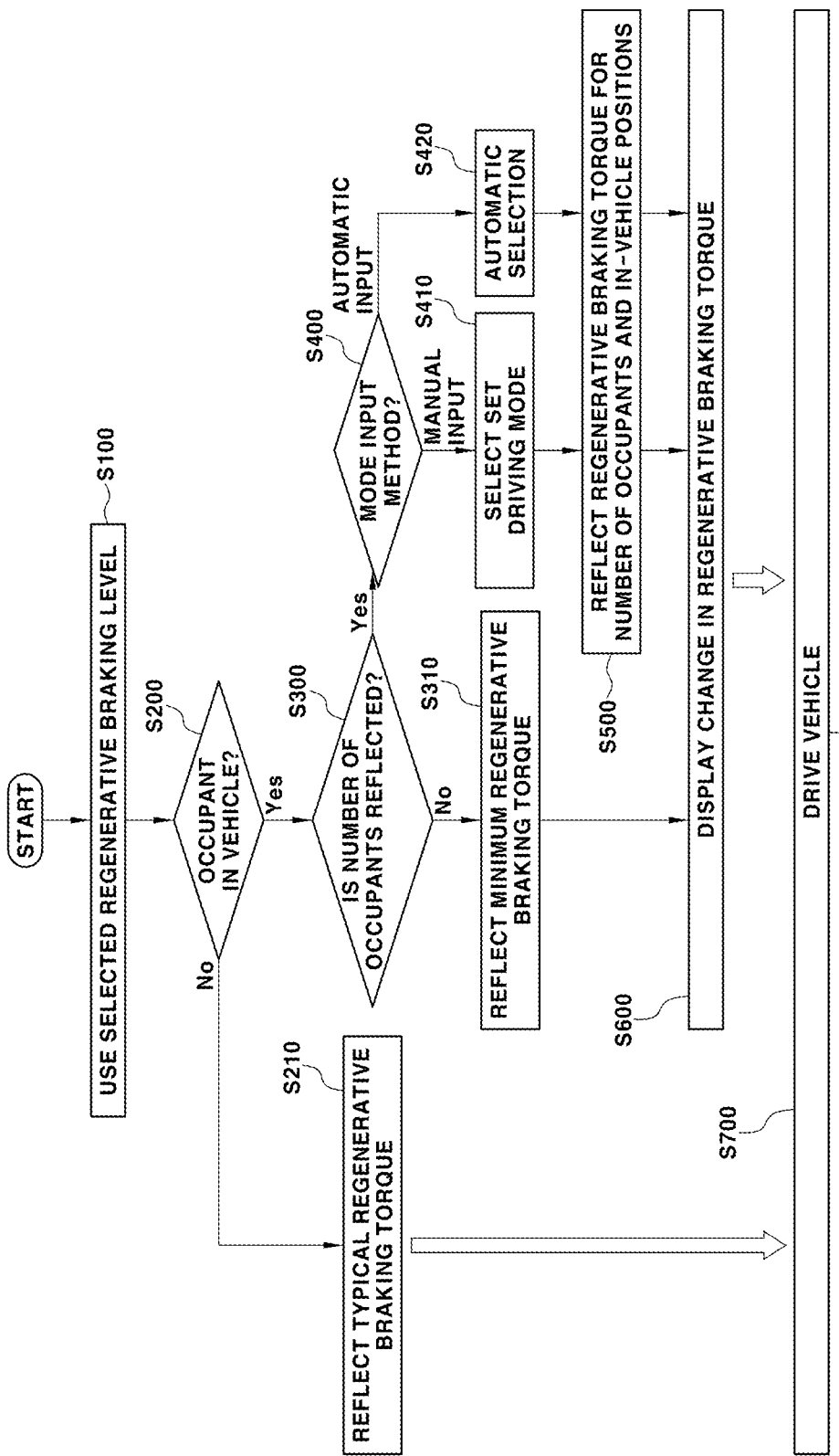
FIG. 4 is a view sequentially illustrating a regenerative braking torque control method of an electric vehicle according to various exemplary embodiments of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings.

The above and other advantages and features of the present disclosure, as well as methods of realizing the same, will be more clearly understood from the following detailed description of embodiments when taken in junction with the accompany drawings.

However, the present disclosure is not limited to specific embodiments to be described hereinafter but may be embodied in a variety of different forms. Rather, these embodiments are provided so that the description of the present disclosure will be complete and will fully convey the scope of the present disclosure to those skilled in the technical field to which various exemplary embodiments of the present disclosure pertains. The present disclosure shall be defined by the scope of the claims.

Furthermore, in the following description of the present disclosure, a detailed description of known technology or the like will be omitted in the situation in which the subject matter of the present disclosure may be rendered rather unclear thereby.

FIG. 1 is a diagram schematically illustrating a regenerative braking torque control system of an electric vehicle according to various exemplary embodiments of the present disclosure, FIG. 2 is a diagram illustrating changes in motor torque for the regenerative braking torque control system of an electric vehicle according to various exemplary embodiments of the present disclosure, and FIG. 3 is a diagram illustrating a determination of a total score for the regenerative braking torque control system of an electric vehicle according to various exemplary embodiments of the present disclosure.

As illustrated in FIG. 1, the regenerative braking torque control system of an electric vehicle according to the exemplary embodiment includes a travel information setting section 100, an in-vehicle information detector 200, and a controller 300.

The travel information setting section 100 allows a regenerative braking level, for example, typically, one of D0 to D3, to be selected in response to a driver's input conducted by, for example, manipulating a positive (+) or negative (−) paddle shift mounted on the steering wheel of a vehicle.

Furthermore, the travel information setting section 100 is configured to allow at least one driving mode among a plurality of driving modes, for example, eco, normal, comfortable, and sports modes, to be set.

In an exemplary embodiment of the present disclosure, the travel information setting section 100 may be implemented by a processor.

The in-vehicle information detector 200 detects in-vehicle information corresponding to the number and in-vehicle positions of occupants seated on vehicle seats.

Here, the in-vehicle information detector 200 may be implemented as a hydraulic sensor, an ultrasonic sensor, etc. Thus, the in-vehicle information corresponding to the number and in-vehicle positions of occupants seated on the seats may be detected using at least one of hydraulic information of the vehicle seats, ultrasonic sensor information, or seat-belt fastening information.

The above-described plurality of sensors of the in-vehicle information detector 200 are not limited. In addition to the hydraulic sensor and the ultrasonic sensor, a combination including other sensors facilitating the in-vehicle information to be detected may be provided.

The controller 300 allows driving to be performed according to a regenerative braking level selected by the travel information setting section 100. The controller 300 transfers motor torque responsiveness according to the number and in-vehicle positions of occupants detected by the in-vehicle information detector 200 to a motor controller 10 for driving by reflecting the motor torque responsiveness on motor torque for regenerative braking.

That is, the controller 300 determines a total score according to the number and in-vehicle positions of occupants detected from the in-vehicle information detector 200 and determines motor torque responsiveness by applying the total score to a predetermined comparison table, such as Table 1 below.

TABLE 1

| Total Occupant Score | 0~3 | 4~7 | 8~11 | 12~14 | 15~ |
|---|---|---|---|---|---|
| Motor Torque Responsiveness | 5 | 4 | 3 | 2 | 1 |

In Table 1, the total score may be determined differently depending on whether each of the in-vehicle positions of occupants with respect to the number of occupants is the seat 1 next to the driver's seat, a second row seat 2, or a third row seat 3, as illustrated in FIG. 3.

For example, when a result obtained by detecting the in-vehicle information using the in-vehicle information detector 200 represents that one occupant is seated on the seat 1 next to the driver's seat and two occupants are seated on second row seats 2, a total occupant score is 5 by adding 1 for the single occupant on the seat 1 next to the driver's seat and 4 for the two occupants on the second row seats 2. When the total occupant score is applied to the predetermined comparison table above, the motor torque responsiveness may be determined to be 4 corresponding to a second occupant score range, i.e., determined to be a score lower than that of a first occupant score range in which a smaller number of occupants are in a vehicle.

The higher the total occupant score applied to the occupant score range is, the lower the motor torque responsiveness is determined to be. Here, a characteristic in that motor torque response to driver manipulation of an accelerator position sensor (APS) is slowed with decreases in the motor torque responsiveness is used.

In other words, as illustrated in FIG. 2, when a driver detaches the foot from the accelerator, the motor torque drops sharply in the process in which regenerative braking is performed. Here, in comparison to a change A1 in which the motor torque responsiveness is determined to be 5, in a change A2 in which the motor torque responsiveness is determined to be 3, the incline of a motor torque decreasing range is relatively gradual, i.e., the response of the motor is slowed.

Furthermore, in a change A3 in which the motor torque responsiveness is determined to be 1, the incline of a motor torque decreasing range is more gradual, i.e., the response of the motor is slower, than that of the change A2 in which the motor torque responsiveness is determined to be 3. When these are summarized, the greater the number of occupants and the more uniformly the in-vehicle positions are distributed across the second row seats 2 or the third row seats 3, the smaller the motor torque responsiveness is.

Thus, the response of the motor torque is slowed, and thus, the motor torque for regenerative braking is gradually reduced over time. Consequently, in a tip portion out in which the driver detaches the foot from the accelerator while driving, impact transferred to occupants in the process in which regenerative braking is performed may be reduced, preventing occupants from dizziness and thus carsickness.

FIG. 4 is a view sequentially illustrating a regenerative braking torque control method of an electric vehicle according to various exemplary embodiments of the present disclosure.

As illustrated in FIG. 4, the regenerative braking torque control method of an electric vehicle according to the exemplary embodiment will be sequentially referred to as follows.

First, when a driver is caused to drive according to a regenerative braking level selected by the travel information setting section 100, i.e., driving is performed as the regenerative braking level is selected to be one of typical D0 to D3 in S100, the in-vehicle information detector 200 is controlled to determine whether one or more occupants (hereinafter, referred to as "occupants") other than the driver are in a vehicle in S200.

Here, the in-vehicle information detector 200 may be implemented as a hydraulic sensor, ultrasonic sensor, etc., and thus, may detect whether occupants are in the vehicle using at least one of hydraulic information of the vehicle seats, ultrasonic sensor information, or seatbelt fastening information.

The above-described plurality of sensors of the in-vehicle information detector 200 are not limited. In addition to the hydraulic sensor and the ultrasonic sensor, a combination including other sensors enabling the in-vehicle information to be detected may be provided.

Here, when no occupant is determined to be in the vehicle by the in-vehicle information detector 200 in S200, the driving is performed by the motor controller by reflecting regenerative braking torque corresponding to the regenerative braking level selected by the travel information setting section 100.

That is, in a situation in which driving is performed according to the highest regenerative braking level corresponding to D3, when no occupant is determined to be in the vehicle by the in-vehicle information detector 200 in S200, the vehicle is driven by reflecting typical regenerative braking torque corresponding to D3 in the same manner as in the related art in S210.

Furthermore, when occupants are determined to be in the vehicle by the in-vehicle information detector 200 in S200, the driver selects whether to reflect the number of occupants in S300.

In the present situation, when the driver selects not to reflect the number of occupants in S300, regenerative braking torque corresponding to a regenerative braking level set to be lowest, of the regenerative braking levels D0 to D3, more particularly, the regenerative braking level D0, is reflected, and the controller 300 controls the motor controller 10 to perform driving using the corresponding regenerative braking torque in S310.

Here, although whether occupants are in the vehicle is detected in the in-vehicle determination step S200, control reflecting the number and in-vehicle positions of occupants is not performed by the driver. Thus, it is directed to minimize impact transferred to occupants in the process in which regenerative braking is performed in a tip out.

Furthermore, as the number of occupants is determined to be reflected in the occupant number reflection determination step S300, driving mode selection is performed by the travel information setting section 100 in S400.

Here, a predetermined set driving mode among the plurality of driving modes, more particularly, a comfortable mode among an eco mode, a normal mode, a comfortable mode, and a sports mode, is selected by the driver in S410. Subsequently, motor torque responsiveness according to the number and in-vehicle positions of occupants detected by the in-vehicle information detector 200 are reflected on regenerative braking torque in S500, and the regenerative braking torque is transferred to the motor controller 10 for driving.

Here, in S500, the controller 300 determines a total score according to the number and in-vehicle positions of occupants detected by the in-vehicle information detector 200 and determines the motor torque responsiveness by applying the total score to a predetermined comparison table as illustrated in Table 1 above.

The total score described above may be determined to be different depending on whether each of the in-vehicle positions of occupants with respect to the number of occupants is the seat 1 next to the driver's seat, a second row seat 2, or a third row seat 3 (see FIG. 3).

For example, when a result obtained by detecting the in-vehicle information using the in-vehicle information detector 200 represents that one occupant is seated on the seat 1 next to the driver's seat and two occupants are seated on second row seats 2, a total occupant score is 5 by adding 1 for the single occupant on the seat 1 next to the driver's seat and 4 for the two occupants on the second row seats 2. When the total occupant score is applied to the predetermined comparison table above, the motor torque responsiveness may be determined to be 4 corresponding to a second occupant score range, i.e., determined to be a score lower than that of a first occupant score range in which a smaller number of occupants are in the vehicle.

The higher the total score applied to the occupant score ranges is, the lower the motor torque responsiveness is determined to be. Here, a characteristic in that motor torque response to the driver manipulation of an APS is slowed with decreases in the motor torque responsiveness is used.

In other words, when a driver detaches the foot from the accelerator, the motor torque drops sharply in the process in which regenerative braking is performed. Here, in comparison to the change A1 in which the motor torque responsiveness is determined to be 5, in the change A2 in which the motor torque responsiveness is determined to be 3, the incline of the motor torque decreasing range is relatively gradual, i.e., the response of the motor is slowed (see FIG. 2).

Furthermore, in the change A3 in which the motor torque responsiveness is determined to be 1, the incline of the motor torque decreasing range is more gradual, i.e., the response of the motor is slower, than that of the change A2 in which the motor torque responsiveness is determined to be 3. When these are summarized, the greater the number of occupants and the more uniformly the in-vehicle positions of occupants are distributed across the second row seats 2 or the third row seats 3, the smaller the motor torque responsiveness is.

Thus, the response of the motor torque is slowed, and thus, the motor torque for regenerative braking is gradually reduced over time. Consequently, in a tip out in which the driver detaches the foot from the accelerator while driving, impact transferred to occupants in the process in which regenerative braking is performed may be reduced, preventing occupants from dizziness and thus carsickness.

Furthermore, in the driving mode selection step S400, in a vehicle in which the set driving mode as described above, i.e., the predetermined separate comfortable mode, is not present, e.g., a vehicle in which only eco, normal, and sports modes are present, it is controlled to automatically perform the regenerative braking torque reflection step S500 without the driving mode being selected by the driver in S420.

In other words, in the above-described vehicle, the predetermined set driving mode cannot be selected. Thus, as occupants are determined to be in the vehicle in S200 and the number of occupants is determined to be reflected in S300, the regenerative braking torque in which occupants are considered, i.e., the regenerative braking torque on which the motor torque responsiveness is reflected, is transferred to the motor controller 10 for driving. Consequently, impact transferred to the occupants in the process in which regenerative braking is performed in a tip out may be reduced.

Additionally, when the corresponding vehicle is driving in the sports mode, there is high possibility that none of deceleration and acceleration considering occupants will be performed in the sports mode. Thus, in the sports mode, the regenerative braking torque reflection step S500 may not be performed.

Finally, as the motor torque responsiveness is reflected on the regenerative braking torque in the regenerative braking torque reflection step S500, different changes in the regenerative braking torque depending on the number and in-vehicle positions of occupants are transferred to the driver in S600.

That is, when the motor torque responsiveness is reflected on the regenerative braking torque, the controller 300 may control an audio-video navigation (AVN) device, a cluster, a head-up display, etc. provided inside the vehicle to display corresponding information, e.g., a differentiated motor torque response range B, to the driver.

Accordingly, the driver may review the motor torque responsiveness based on the corresponding display information, and based on the motor torque responsiveness, determine a change in the regenerative braking torque according to the selected regenerative braking level while driving of the vehicle. Consequently, the driver may perform driving by changing the regenerative braking level set in the previous step S100 to another regenerative braking level.

According to various exemplary embodiments of the present disclosure, when regenerative braking is used, the regenerative braking torque is reflected by considering the number and in-vehicle positions of occupants in a vehicle. As a predetermined set driving mode is selected by the driver, driving is caused to be performed by reflecting the motor torque responsiveness, determined based on a score corresponding to the number and in-vehicle positions of occupants, on the regenerative braking torque. As an effect, a differentiated motor torque response range for regenerative braking is formed depending on the number and in-vehicle positions of occupants.

Accordingly, in various exemplary embodiments of the present disclosure, it is possible to selectively adjust the change of the motor torque for regenerative braking by reflecting the presence of occupants, the number of occupants, and the in-vehicle position. Consequently, in a repeatedly accelerating or decelerating situation, it is possible to prevent occupants from dizziness and thus carsickness.

Furthermore, the term related to a control device such as "controller", "control apparatus", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. Itis intended that the scope of the present disclosure be defined by the Claims appended hereto and their equivalents.

What is claimed is:

1. A regenerative braking torque control system of an electric vehicle, the system comprising:
a driving mode selector configured for selecting a regenerative braking level in response to a driver's input and setting at least one driving mode among a plurality of driving modes;
an in-vehicle information detector configured for detecting in-vehicle information corresponding to a number and in-vehicle positions of occupants seated on vehicle seats; and
a controller configured to drive the electric vehicle based on the regenerative braking level selected by the driving mode selector,
wherein the controller is configured for transferring motor torque responsiveness according to the number and the in-vehicle positions of the occupants detected by the in-vehicle information detector to a motor controller for driving the electric vehicle by associating the motor torque responsiveness with regenerative braking torque,
wherein the controller is configured to determine a total score according to the number and the in-vehicle positions of the occupants detected by the in-vehicle information detector and to determine the motor torque responsiveness by applying the total score to a predetermined comparison table,
wherein the total score is differently determined depending on whether each of the in-vehicle positions with respect to the number of the occupants is a seat next to the driver's seat, a second row seat, or a third row seat, among the vehicle seats, and
in the predetermined comparison table, a plurality of occupant score ranges to which the total score is applied are divided, and the motor torque responsiveness is set differently according to the occupant score ranges.

2. The regenerative braking torque control system of claim 1, wherein the in-vehicle information detector is configured to detect the in-vehicle information using at least one of hydraulic information of the vehicle seats, seatbelt fastening information, or ultrasonic sensor information.

3. The regenerative braking torque control system of claim 1, wherein the motor torque responsiveness is determined to be lower as the total score applied to the occupant score ranges is higher.

4. A regenerative braking torque control method of an electric vehicle, the method comprising:
driving the electric vehicle according to a regenerative braking level selected by driving mode selector;
determining, by an in-vehicle information detector, whether occupants are in the electric vehicle;
based on determining that the occupants are present in the electric vehicle by the in-vehicle information detector and when a number of the occupants is reflected in response to a driver's selection, selecting, by the driving mode selector, a driving mode among a plurality of driving modes; and
based on selecting a set driving mode among the plurality of driving modes, associating motor torque responsiveness according to the number and in-vehicle positions of the occupants detected by the in-vehicle information detector with regenerative braking torque and transferring the motor torque responsiveness to a motor controller for the driving,
wherein associating of the motor torque responsiveness includes determining a total score according to the number and the in-vehicle positions of the occupants detected by the in-vehicle information detector and determining the motor torque responsiveness by applying the total score to a predetermined comparison table,
wherein the total score is differently determined depending on whether each of the in-vehicle positions with respect to the number of the occupants is a seat next to the driver's seat, a second row seat, or a third row seat, and
wherein in the predetermined comparison table, a plurality of occupant score ranges to which the total score is applied are divided, and the motor torque responsiveness is set differently according to the occupant score ranges.

5. The regenerative braking torque control method of claim 4, wherein, in the determination of whether the occupants are in the electric vehicle, when no occupants are determined to be in the electric vehicle through the in-vehicle information detector, the electric vehicle is driven by the motor controller by using the regenerative braking torque corresponding to the regenerative braking level selected by the mode selector.

6. The regenerative braking torque control method of claim 4, wherein, in the selection of the driving mode, when the driving of the electric vehicle is determined to be performed in another driving mode except for a sports mode among the driving modes for the electric vehicle in which the set driving mode is not provided, automatic selection is activated to perform the reflection of the motor torque responsiveness.

7. The regenerative braking torque control method of claim 4, wherein, in determining that the occupants are in the electric vehicle, in response that it is selected by the driver not to reflect the number of the occupants, the electric vehicle is driven based on the regenerative braking torque corresponding to the regenerative braking level set to be lowest, among regenerative braking levels.

8. The regenerative braking torque control method of claim 4, wherein the determination of whether the occupants are in the electric vehicle includes detecting in-vehicle information using at least one of hydraulic information of seats, seatbelt fastening information, or ultrasonic sensor information.

9. The regenerative braking torque control method of claim 4, wherein the motor torque responsiveness is determined to be lower as the total score applied to the occupant score ranges is higher.

10. The regenerative braking torque control method of claim 4, further including, as the motor torque responsiveness is associated with the regenerative braking torque, displaying, by the controller, different changes in the regenerative braking torque depending on the number and the in-vehicle positions of the occupants to the driver.

* * * * *